United States Patent
Angot et al.

(10) Patent No.: US 11,162,784 B2
(45) Date of Patent: Nov. 2, 2021

(54) PROFILE MEASUREMENT SYSTEM AND PROFILE MEASUREMENT METHOD

(71) Applicant: Industrial Technology Research Institute, Hsinchu (TW)

(72) Inventors: Ludovic Angot, Hsinchu (TW); Yueh-Yi Lai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/729,499

(22) Filed: Dec. 30, 2019

(65) Prior Publication Data

US 2021/0199425 A1  Jul. 1, 2021

(51) Int. Cl.
| | | |
|---|---|---|
| *G01B 11/24* | (2006.01) | |
| *G01B 11/25* | (2006.01) | |
| *G02B 3/14* | (2006.01) | |
| *G02B 27/00* | (2006.01) | |

(52) U.S. Cl.
CPC ............ *G01B 11/2513* (2013.01); *G02B 3/14* (2013.01); *G02B 27/0025* (2013.01)

(58) Field of Classification Search
CPC ... G01B 11/0608; G01B 11/14; G01B 11/254; G01B 11/24; G01B 11/25; G01B 11/1513; G01B 11/1518; G01B 11/026; G01B 2210/286; G01B 15/04; G06T 7/55; A61B 5/1077
USPC ................. 356/601–623; 382/141, 100, 145; 359/666, 820, 667, 665
See application file for complete search history.

(56) References Cited

U.S. PATENT DOCUMENTS

| | | | |
|---|---|---|---|
| 6,344,930 B1 * | 2/2002 | Kaneko ............ | H04N 5/232123 |
| | | | 359/666 |
| 8,050,461 B2 | 11/2011 | Shpunt et al. | |
| 8,773,514 B2 | 7/2014 | Gharib et al. | |

(Continued)

FOREIGN PATENT DOCUMENTS

| | | |
|---|---|---|
| CN | 103852031 | 6/2018 |
| CN | 108871206 | 11/2018 |

(Continued)

OTHER PUBLICATIONS

"Office Action of Taiwan Counterpart Application", dated Sep. 2, 2020, p. 1-p. 6.

*Primary Examiner* — Hoa Q Pham
(74) *Attorney, Agent, or Firm* — JCIPRNET

(57) ABSTRACT

System and method for profile measurement are provided. The profile measurement system includes a light projector, an imaging device, a control system, and a processing unit. The light projector includes a light source, a mask, and an optical system. An aperture of the mask allows a portion of light to pass through and generates a pattern. The optical system includes a variable focal length lens element configured to project the pattern at different projection distances. The imaging device is configured to capture images of the pattern projected at the different projection distances. The control system is configured to control a projection distance of the light projector and a focus distance of the imaging device. The processing unit is configured to obtain in-focus pixels in the captured images, generate mask images, reconstruct a large depth of field pattern image based on the captured images and reconstruct the object profile.

18 Claims, 15 Drawing Sheets

(56) References Cited

U.S. PATENT DOCUMENTS

| | | | |
|---|---|---|---|
| 9,030,529 B2 * | 5/2015 | Chen | G06T 7/521 |
| | | | 348/47 |
| 9,868,256 B2 * | 1/2018 | Tseng | B29C 64/393 |
| 9,930,243 B2 | 3/2018 | Gladnick et al. | |
| 10,254,111 B2 | 4/2019 | Thiel et al. | |
| 10,746,536 B2 * | 8/2020 | Tsuchida | G01B 11/25 |
| 2007/0124949 A1 * | 6/2007 | Burns, Jr. | G01B 11/2513 |
| | | | 33/288 |
| 2016/0291200 A1 * | 10/2016 | Bakin | G01V 8/20 |
| 2018/0036885 A1 | 2/2018 | Kitamura | |
| 2018/0253863 A1 * | 9/2018 | Wallack | G06T 7/80 |
| 2019/0162945 A1 | 5/2019 | Hua et al. | |

FOREIGN PATENT DOCUMENTS

| | | |
|---|---|---|
| JP | 2012007961 | 1/2012 |
| TW | 200516229 | 5/2005 |
| TW | I463244 | 12/2014 |
| TW | I679442 | 12/2019 |

* cited by examiner

PROFILE MEASUREMENT SYSTEM AND PROFILE MEASUREMENT METHOD

BACKGROUND

Field of the Disclosure

The disclosure relates to a profile measurement system and a profile measurement method.

Description of Related Art

Non-contact inspection methods involving the projection of a light pattern have been extensively used in applications ranging from measurement and inspection of railroad track profiles to high precision machined parts. These methods have mostly been implemented using a laser as a light source to project a line of light onto an object. The shape of the projected line of light is directly related to the shape of the object in the direction along which the line is projected, and by capturing an image of the projected line with an imaging system, the profile of the object can be recovered according to well-known triangulation principle. While lasers offer the highest power density of any light source as well as a large Depth Of Field of the projected line, they are often not eye-safe, their use has to follow stringent regulations, and the captured image suffers from the presence of speckle noise. LED based light sources don't present any of these drawbacks but light intensity is much lower and depth of field is narrower, the later limits the application of LED based triangulation systems to object with a small third dimension.

SUMMARY

The disclosure provides a profile measurement system and a profile measurement method capable of measuring an object having a depth or height larger than the depth of field of the system.

A profile measurement system of an embodiment of the disclosure includes a light projector, an imaging device, a control system, and a processing unit. The light projector is configured to project a pattern of light on an object at different distances, the pattern includes at least one geometrical shape. The light projector includes a light source, a mask, and an optical system. The light source is configured to provide light. The mask is disposed on a transmission path of the light and has an aperture to allow a portion of the light to pass through in order to generate the pattern of light. The optical system is disposed on the transmission path of the light and includes an electrically variable focal length lens element and is configured to project the pattern of light at different projection distances. The imaging device is configured to capture images of the pattern of light projected at the different projection distances, wherein the imaging device includes a lens system and an imaging sensor. The control system is configured to control a projection distance of the projector and a focus distance of the imaging device. The processing unit is configured to detect and retrieve in-focus pixels in the captured images, generate mask images each containing a mask region and an in-focus region based on the in-focus pixels, reconstruct a large depth of field pattern image based on the captured images and reconstruct the object profile.

A profile measurement method of an embodiment of the disclosure includes steps as follow. Projecting a pattern on an object at different projection distances. Capturing images of the pattern projected at the different projection distances. Obtaining in-focus pixels in the captured images. Reconstructing a large depth of field pattern image. Obtaining the object profile.

In order to make the aforementioned and other features and advantages of the disclosure more comprehensible, embodiments and accompanying figures are described in detail below.

BRIEF DESCRIPTION OF THE DRAWINGS

The accompanying drawings are incorporated in and constitute a part of this specification. The drawings illustrate embodiments and, together with their description, serve to explain the principles of the disclosure.

DETAILED DESCRIPTION OF DISCLOSED EMBODIMENTS

A profile measurement system and a profile measurement method in any of the embodiments of the disclosure is adapted to measure surface topography of an object. Specifically, the profile measurement system in any of the embodiments of the disclosure is adapted to measure the profile of an object even when the height of the profile of the object is larger than the Depth Of Field (DOF) of the system. A step object containing two parallel planes at different distances and an inclined plane connected both parallel planes is used as an example for convenience to describe the embodiments and figures below but the structure of the object to be measured is not limited thereto.

Figure 1A:
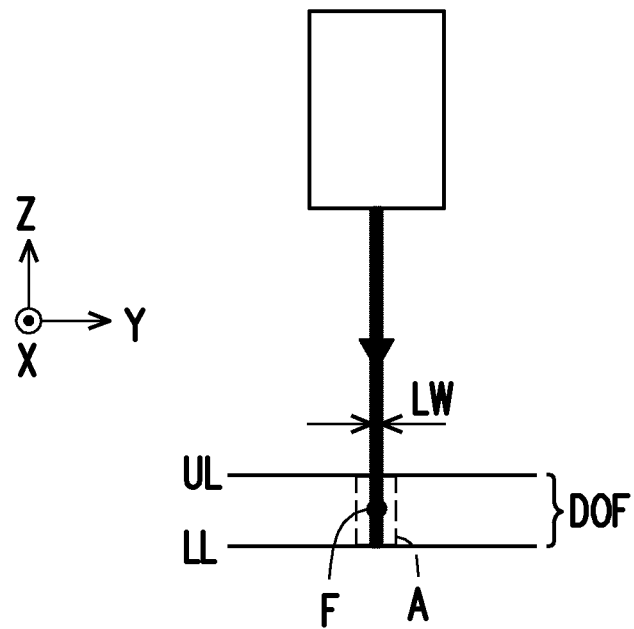
FIG. 1A is a schematic view of a projector projecting a line light.
Figure 1B:
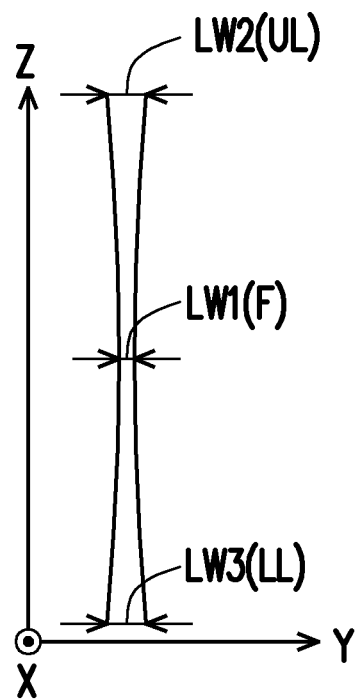
FIG. 1B is an enlarged view of region A in FIG. 1A.

FIG. 1A is a schematic view of a projector projecting a line light as in prior arts. FIG. 1B is an enlarged view of a region A in FIG. 1A. The projector is a line light source that projects a line of light extending in a direction X and having a line width LW in a direction Y. The depth of field of the projector is defined by the depth range within which the line width of the line projected on the object doesn't give rise to any resolution loss of the measured object profile. This can be better understood by referring to FIG. 1B and FIGS. 2A to 2D. As shown in FIG. 1B, the line width LW1 is the smallest at the focus distance shown at point F. The line width increases as vertical distance (distance measured along direction Z) to the point F varies. Therefore, the line width LW2 at the upper limited UL and the line width LW3 at the lower limit LL are both greater than the line width LW1 at the point F.

Figure 2A:
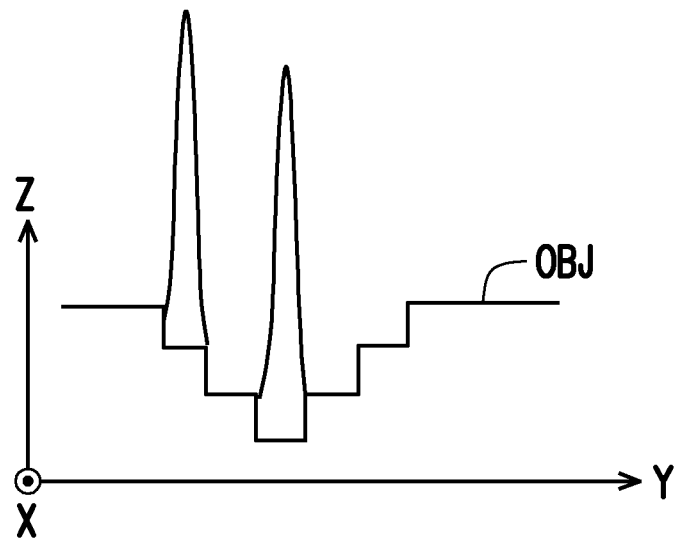
FIG. 2A and FIG. 2B are schematic views showing an object's profile being measured by light having a narrow and a wide line width respectively.
Figure 2B:
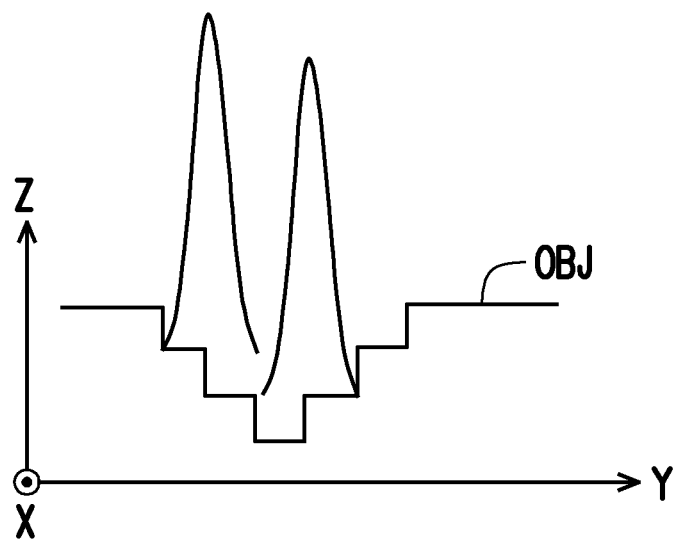
Figure 2C:
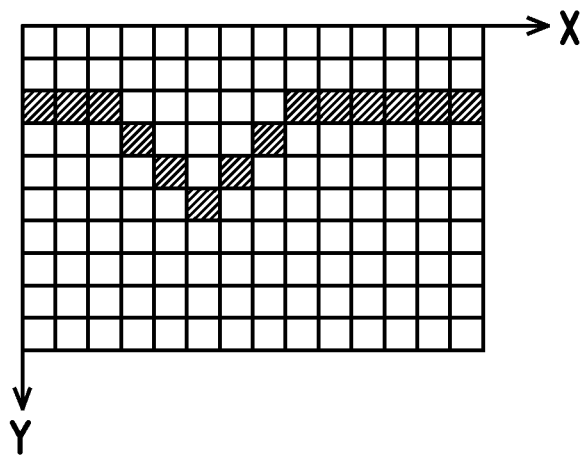
FIG. 2C and FIG. 2D are schematic views showing images captured by an image sensor corresponding to FIG. 2A and FIG. 2B respectively.
Figure 2D:
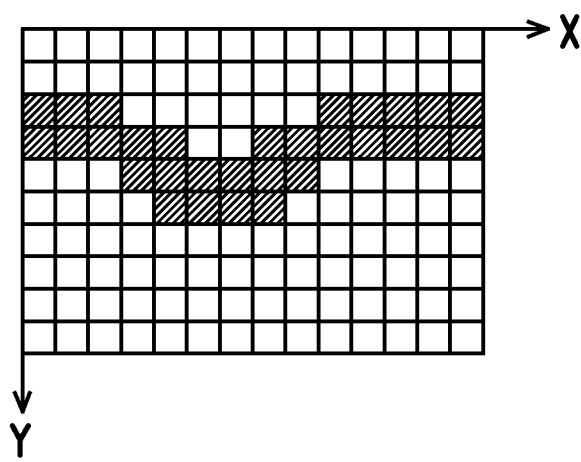

FIG. 2A and FIG. 2B are schematic views showing an object's profile being measured by a line light having a narrow and a large line widths. In both figures, the line light is projected at different locations on the object OBJ. FIG. 2C and FIG. 2D are schematic views showing images captured by a sensor (not shown) corresponding to FIG. 2A and FIG. 2B respectively. FIG. 2C shows greater details in the image of the projected line light compared to that in FIG. 2D. The additional details corresponding to the projection of the thin line light of FIG. 2A leads to a more accurate recovered profile compared to if the line light line width is larger than the object's structure, as shown in FIGS. 2B and 2F. It can therefore be understood that for objects with a large dimensions along the direction Z, the varying line width of the projected line will lead to loss of resolution in the recovered object profile where the line width is large compared to the object's structure. An embodiment of the present disclosure may improve the limited depth of field characterizing the prior arts and thus enable profile measurement of objects with large depths with respect to the depth of field of the projected line.

Figure 3:
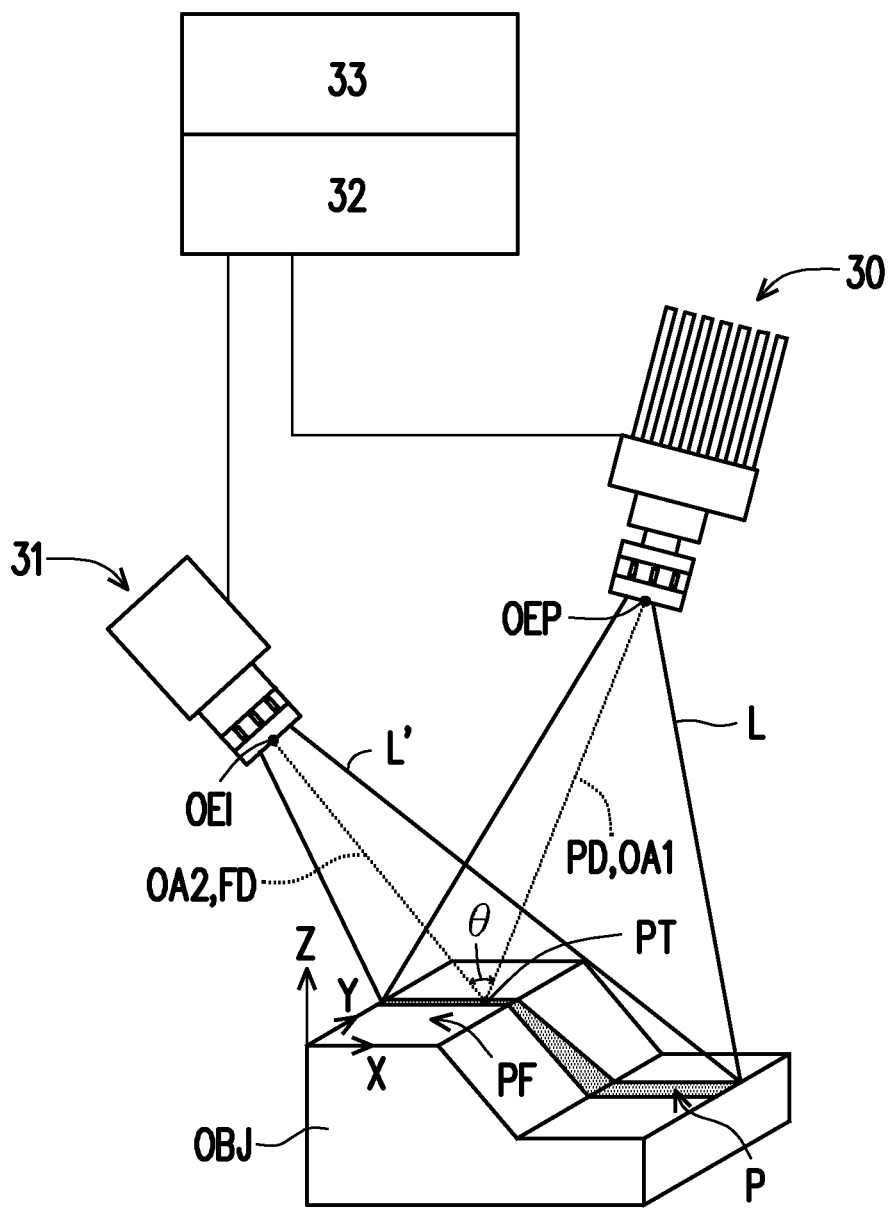
FIG. 3 is a schematic view of a profile measurement system according to an embodiment of the disclosure.

FIG. 3 is a schematic view of a profile measurement system according to an embodiment of the disclosure. The profile measurement system includes a light projector (e.g. a projector 30), an imaging device 31, a control system 32, and a processing unit 33.

Figure 13:
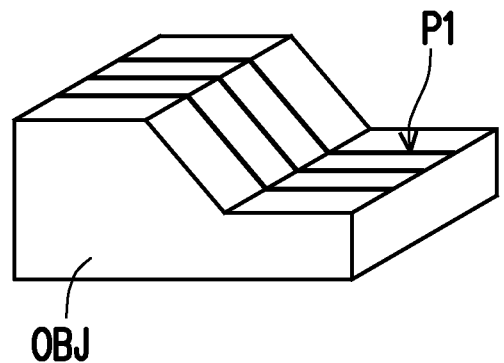
FIG. 13 and FIG. 14 are schematic views of patterns that can be used in embodiments of the disclosure.
Figure 14:
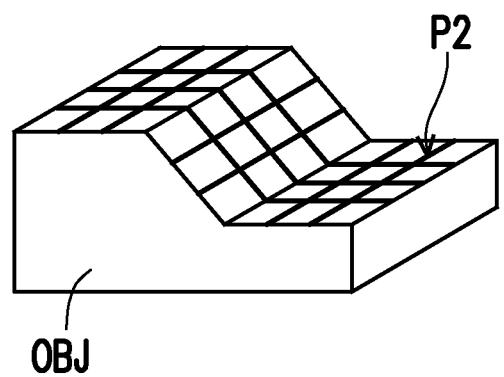

The projector 30 is configured to project a pattern P on an object OBJ. The pattern P includes at least one geometrical shape (e.g. a straight line, a curved line, or any given geometrical pattern). For the purpose of illustrating the embodiment, the projector 30 is a line projector that projects a single line on the object OBJ. FIG. 13 and FIG. 14 are schematic views of patterns P1 and P2 that can be used in embodiments of the disclosure. As shown in FIG. 13 and FIG. 14, the pattern projected by the projector may be a set of parallel lines (e.g. pattern P1 in FIG. 13) or a set of parallel and perpendicular lines (e.g. pattern P2 in FIG. 14).

FIG. 4A to FIG. 4D respectively are schematic views of projectors 30A to 30D used in embodiments of the disclosure. The projector (any one of the projectors 30A to 30D) includes a light source 300, a mask 301, and an optical system (any one of the optical systems 302A to 302D).

Figure 4A:
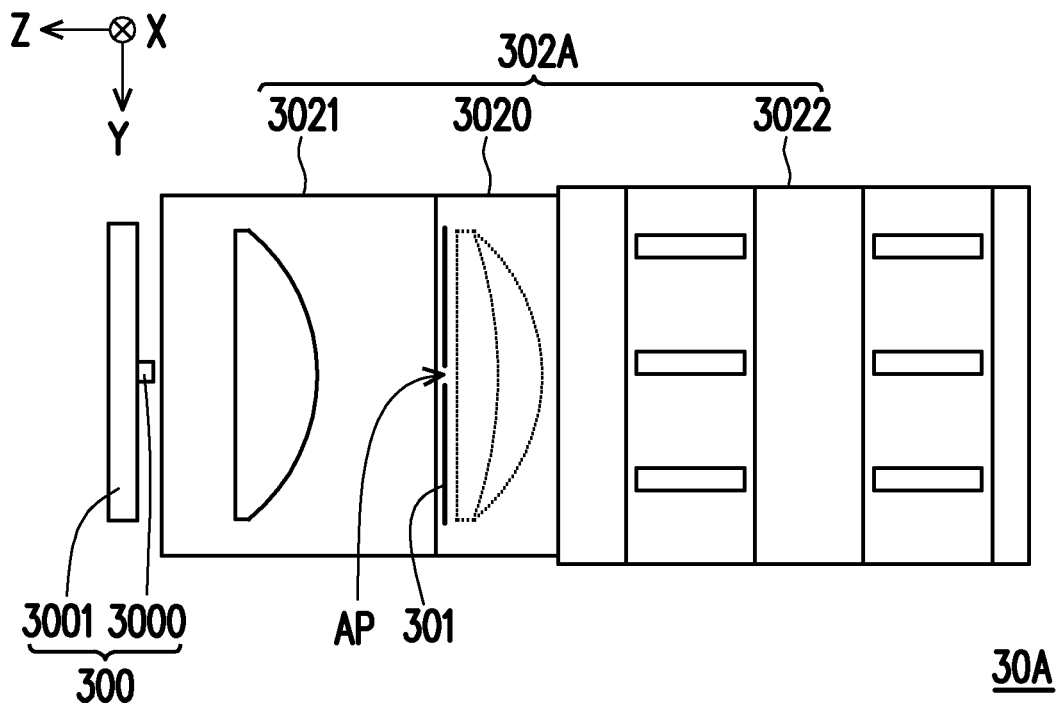
FIG. 4A to FIG. 4D are schematic views of projectors used in embodiments of the disclosure.
Figure 4B:
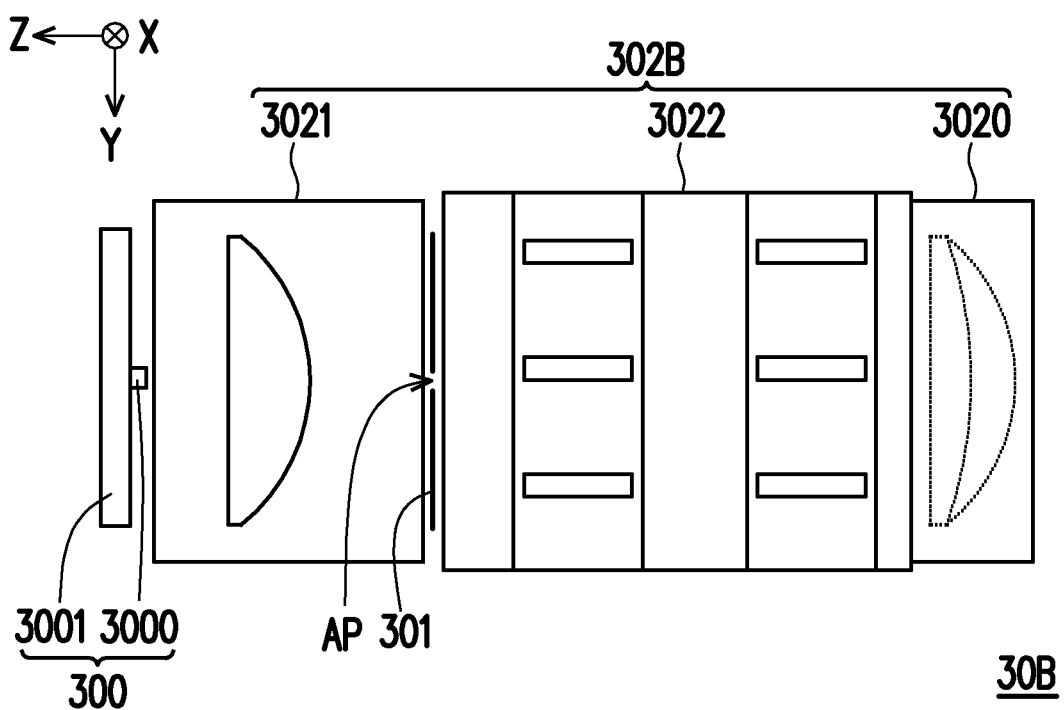
Figure 4C:
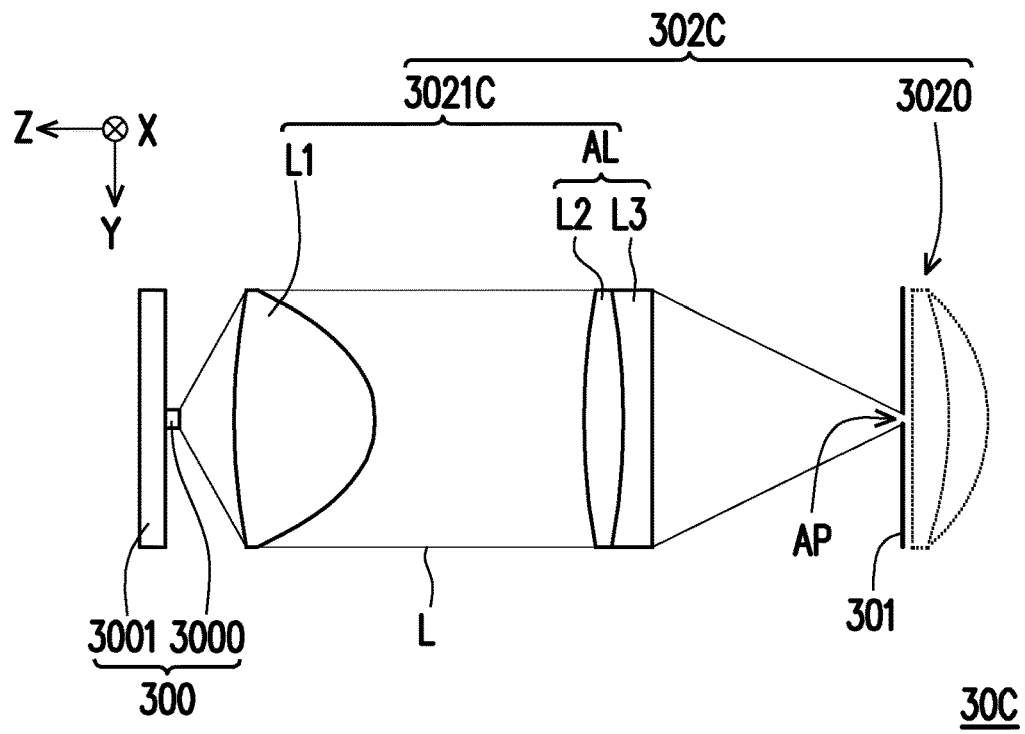
Figure 4D:
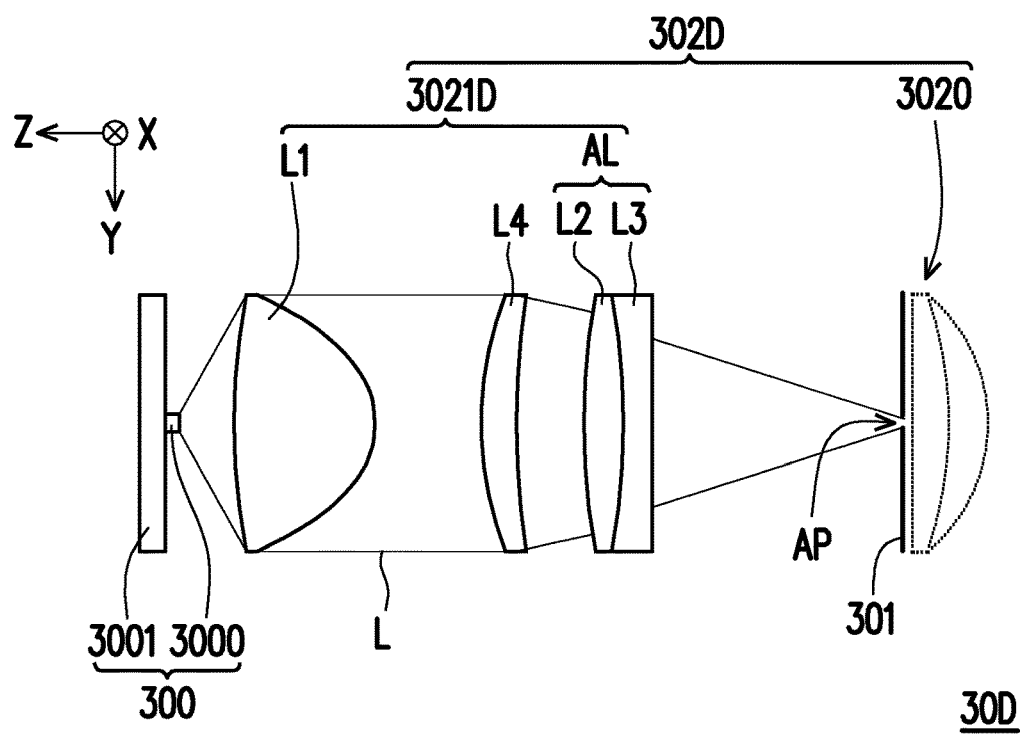

The light source 300 is configured to provide light L (shown in FIG. 4C and FIG. 4D). In the embodiment, the light source 300 may include a light emitting diode (LED) 3000 and a circuit board 3001, wherein the LED 3000 is disposed on and electrically connected to the circuit board 3001.

The mask 301 is disposed on a transmission path of the light L. The mask 301 has an aperture AP to allow a portion of the light L to pass through and to generate the pattern (e.g. the pattern P in FIG. 3). In the embodiment, the shape of the aperture AP is a line extending along the direction X, but not limited thereto. In other embodiments, the shape of the aperture AP may be a set of parallel lines or a set of parallel and perpendicular lines.

The optical system (any one of the optical systems 302A to 302D) is disposed on the transmission path of the light L and includes a variable focal length lens element 3020 (e.g. tunable lens or liquid lens) configured to project the pattern P (shown in FIG. 3) at different projection distances (FIG. 3 schematically shows a projection distance PD). The projection distance PD is a distance along optical axis OA1 of the projector 30, from the frontmost element (e.g. the output end OEP) of the projector 30 to a point PT on a plane of focus PF on a surface of the object OBJ, so that the point PT is in focus.

The pattern P is projected at different projection distances PD by controlling a focal length of the variable focal length lens element 3020, and the focal length of the variable focal length lens element 3020 is controlled by changing the value of an electrical parameter (e.g. a voltage or a current) applied to the variable focal length lens element 3020. The variable focal length lens element 3020 can be a lens element from Optotune, Varioptics or Mitutoyo, but is not limited thereto.

In FIG. 4A, the optical system 302A further includes a conditioning lens 3021 and a projecting lens 3022. The conditioning lens 3021 is located between the light source 300 and the mask 301, and the mask 301 is located between the conditioning lens 3021 and the projecting lens 3022. In the embodiment, the conditioning lens 3021 is configured to project light from the light source 300 at an angle close or equal to 90 degrees on the mask 301, that is, the conditioning lens 3021 is configured to project a collimated or nearly collimated light on the mask 301.

In the embodiment, the variable focal length lens element 3020 is located between the projecting lens 3022 and the mask 301. As shown in the optical system 302B of FIG. 4B, the projecting lens 3022 may be located between the variable focal length lens element 3020 and the mask 301. The variable focal length lens element 3020 may be a part of the conditioning lens 3021.

In FIG. 4C, the optical system 302C is telecentric. Specifically, the optical system 302C includes the variable focal length lens element 3020 and a conditioning lens 3021C. The conditioning lens 3021C includes a condenser lens L1 and an achromatic lens AL composed of lens elements L2 and L3. The condenser lens L1, the lens element L2 and the lens element L3 are sequentially arranged from the light source side to the mask side. The mask 301 is located in a focal plane of the conditioning lens 3021C.

In FIG. 4D, the optical system 302D is also telecentric. Specifically, the optical system 302D not only includes the condenser lens L1, the lens element L2 and the lens element L3, but also includes a positive meniscus lens L4 disposed between the condenser lens L1 and the lens element L2. The role of the positive meniscus lens L4 is to increase the numerical aperture (NA) of the conditioning lens 3021D. The mask 301 is located in a focal plane of the conditioning lens 3021D.

Figure 4E:
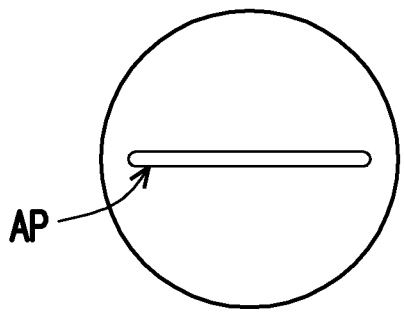
FIG. 4E to FIG. 4G are schematic views of masks used in embodiments of the disclosure.
Figure 4H:
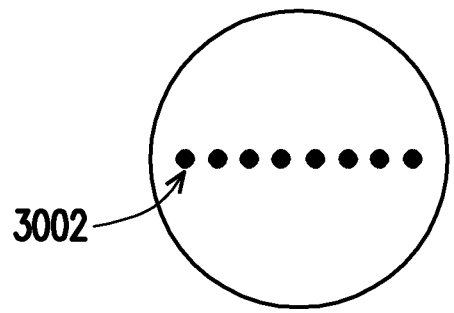
FIG. 4H to FIG. 4J are schematic views of light sources used in embodiments of the disclosure.
Figure 4F:
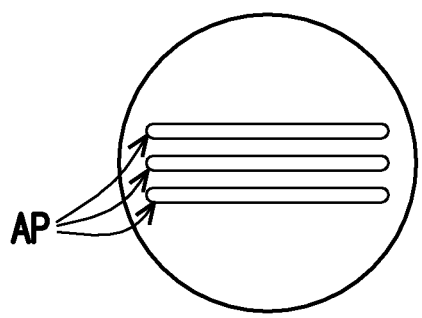
Figure 4I:
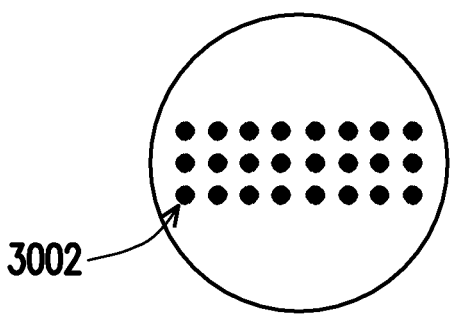
Figure 4G:
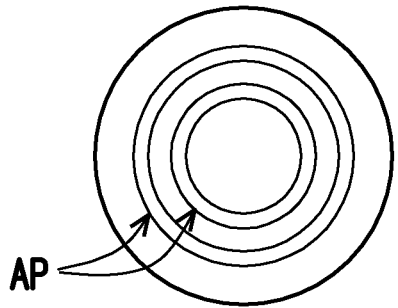
Figure 4J:
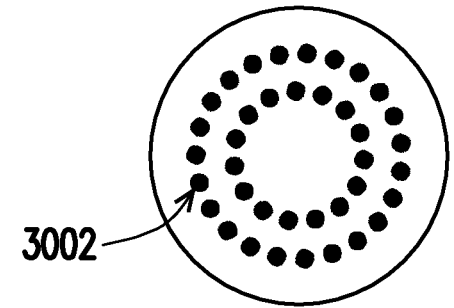

FIG. 4E to FIG. 4G are schematic views of masks used in embodiments of the disclosure. FIG. 4H to FIG. 4J are schematic views of light sources used in embodiments of the disclosure. As shown in FIG. 4E to FIG. 4J, the light source (shown in FIG. 4H to FIG. 4J) may have a shape corresponding to the mask (shown in FIG. 4E to FIG. 4G) and includes a plurality of light emitting diode chips 3002 arranged according to a shape of the aperture AP of the mask.

Referring to FIG. 3, the imaging device 31 is configured to capture images of the pattern P projected at the different projection distances. The images of the pattern P projected at the different projection distances may be captured by the imaging device 31 by controlling a focus distance FD of the imaging device 31. The focus distance FD of the imaging device 31 is a distance, along optical axis OA2 of the imaging device 31, from the frontmost element (e.g. the output end OEI) of the imaging device 31 to a point PT on the plane of focus PF on the surface of the object OBJ, so that the point PT is in focus. In the embodiment, an angle θ between the optical axis OA1 of the projector 30 and the optical axis OA2 of the imaging device 31 is larger than 0 degrees and smaller than 180 degrees.

The imaging device 31 includes a lens system (not shown) and an imaging sensor (not shown). The lens system of the imaging device 31 is configured to transmit the light L' reflected from the object OBJ to the imaging sensor. The lens system of the imaging device 31 may be entocentric, object-side telecentric or bi-telecentric but not limited thereto. The imaging sensor may include a charge-coupled device (CCD) or a complementary metal-oxide semiconductor (CMOS), but not limited thereto.

In the embodiment, the imaging device 31 may further include a variable focal length lens element (not shown), and the focus distance FD of the imaging device 31 may be controlled by changing the value of an electrical parameter (e.g. a voltage or a current) applied to the variable focal length lens element of the imaging device 31.

The control system 32 is configured to control the projection distance PD of the projector 30 and the focus distance FD of the imaging device 31. Specifically, the control system 32 is coupled to the projector 30 and the imaging device 31, and the control system 32 may independently control the projector 30 and the imaging device 31 by varying the electrical parameters (or command signals) sent to the projector 30 and the imaging device 31.

The control system 32 may include one or more controllers to independently control the projector 30 and the imaging device 31. In one embodiment, the control system 32 may be built in at least one of the projector 30 and the imaging device 31.

The processing unit 33 is configured to obtain profile of the object OBJ within a region of interest of the projected pattern P. Specifically, the processing unit 33 is coupled to the projector 30 and the imaging device 31, and the processing unit 33 is configured to access in-focus pixels in the captured images, generate mask images each containing a mask region and an in-focus region based on the in-focus pixels, reconstruct a large depth of field pattern image based on the captured images (described later) and reconstruct the object profile. A large depth of field represents a depth of field larger than or equal to the height difference of the object OBJ. In one embodiment, the processing unit 33 may include at least one processor and may be built in at least one of the projector 30 and the imaging device 31 or built in a mobile device, a gateway, or a cloud system, etc.

Figure 5:
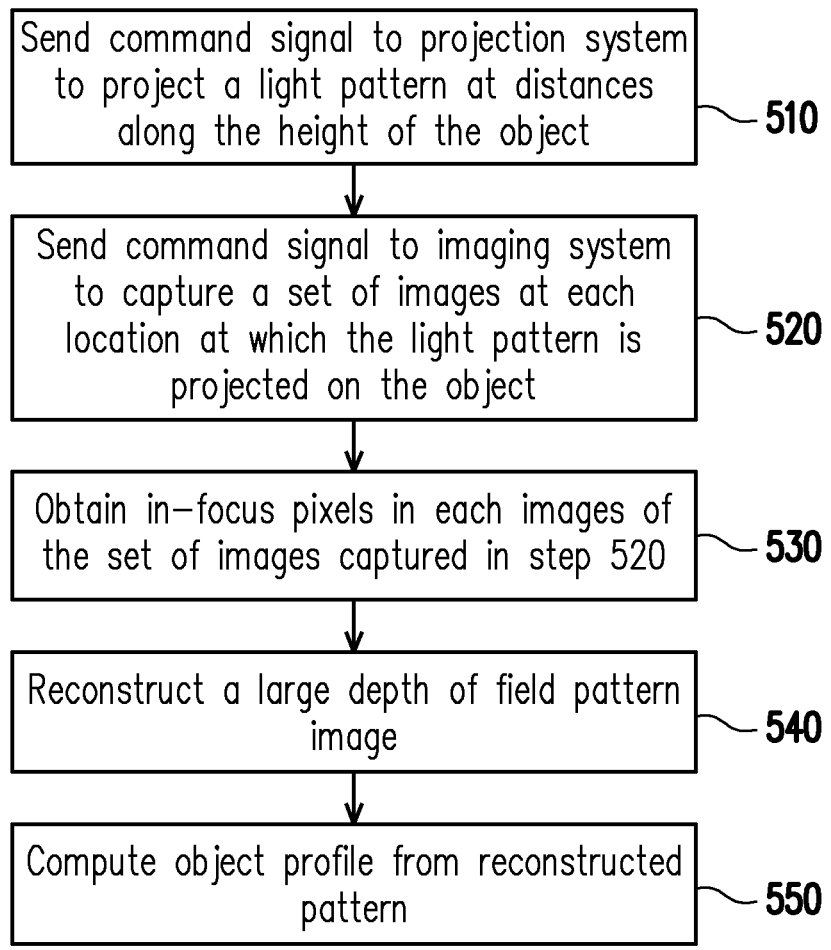
FIG. 5 is a flow chart showing a profile measurement method operated in synchronous mode according to an embodiment of the disclosure.

A profile measurement method of the disclosure may operate in synchronous or asynchronous mode, as will be described in the following sections and FIGS. 5 to 7. FIG. 5 is a flow chart showing a profile measurement method operated in synchronous mode according to an embodiment of the disclosure. The profile measurement method operated in synchronous mode includes the steps of: sending a command signal to a projection system (e.g. an optical system of a projector) to project a light pattern at distances along the height of an object (step 510); sending a command signal to an imaging system (e.g. a lens system of an imaging device) to capture a set of images at each location at which the light pattern is projected on the object (step 520); obtaining in-focus pixels in each images of the set of images captured in step 520 (step 530); reconstructing a large depth of field pattern image from the in-focus pixels obtained in step 530 (step 540); and computing the object profile from the reconstructed pattern obtained in step 540 (step 550).

In step 510, the command signal may be send by the control system (hereinafter referred to as controller) to the projector to project the pattern at a given projection distance. In step 520, the command signal may be sent by the controller to the imaging device to capture images at a given distance. In the synchronous mode, the control signal parameters required to project a pattern at a given distance and the control signal parameters required to capture a focused image at a given distance are known. An example of a relationship between control signal parameters applied to the projector and the projection distance of the light pattern is shown in FIG. 7A. The signal may be an electrical signal in the form of a current or a voltage but it is not limited thereto. Similarly, an example of a relationship between control signal parameters applied to the imaging device and the distance to capture in-focus images is shown in FIG. 7B. In FIG. 7A, the signal applied to the projector refers to the signal applied to the variable focal length lens element of the projector, and in FIG. 7B, the signal applied to the imaging device refers to the signal applied to the variable focal length lens element of the imaging device. The relationships between the signal and projecting or imaging distances shown on FIGS. 7A and 7B can be obtained by a calibration step and stored in memory in the form of lookup tables. The look-up tables may be used in the synchronous mode to synchronously control the projector and the imaging device in such a way that the scan operations shown in step 620 of FIG. 6 can be avoided.

Figure 6:
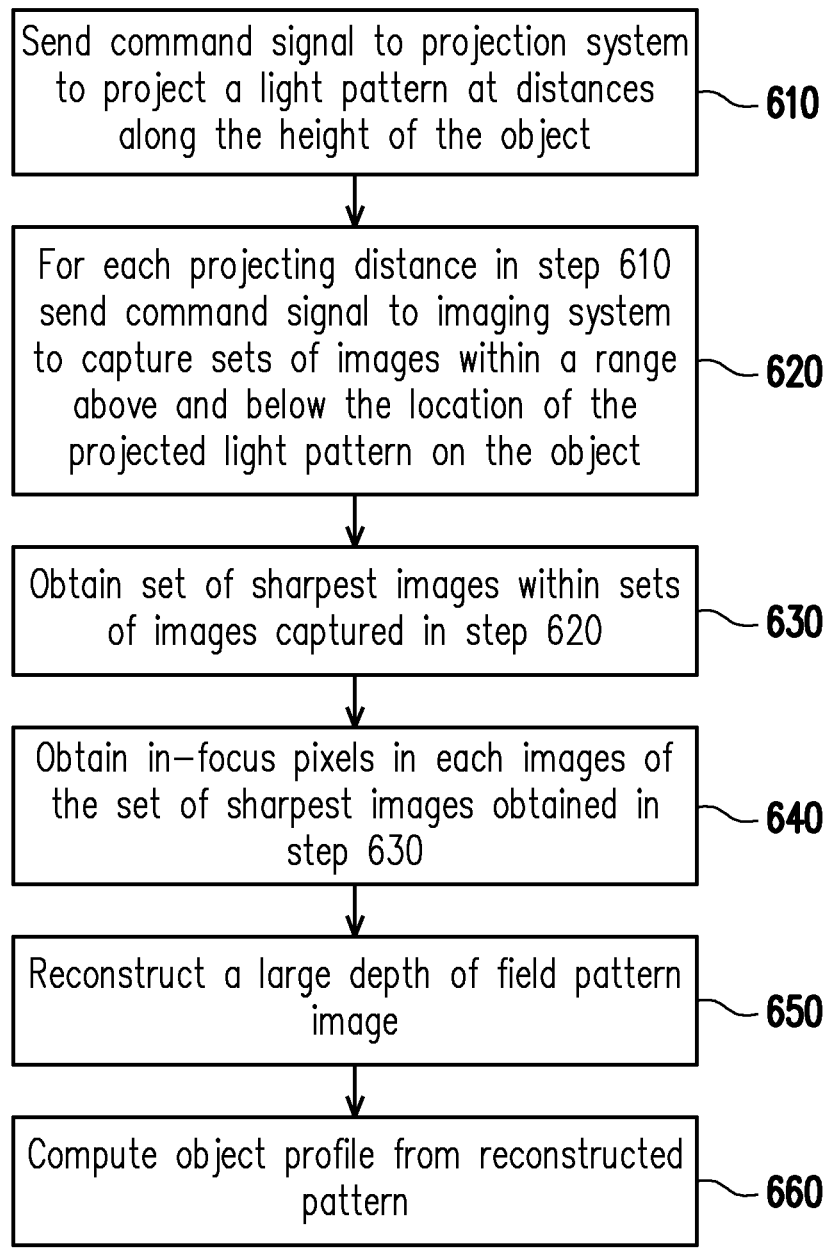
FIG. 6 is a flow chart showing a profile measurement method operated in asynchronous mode according to an embodiment of the disclosure.
Figure 7A:
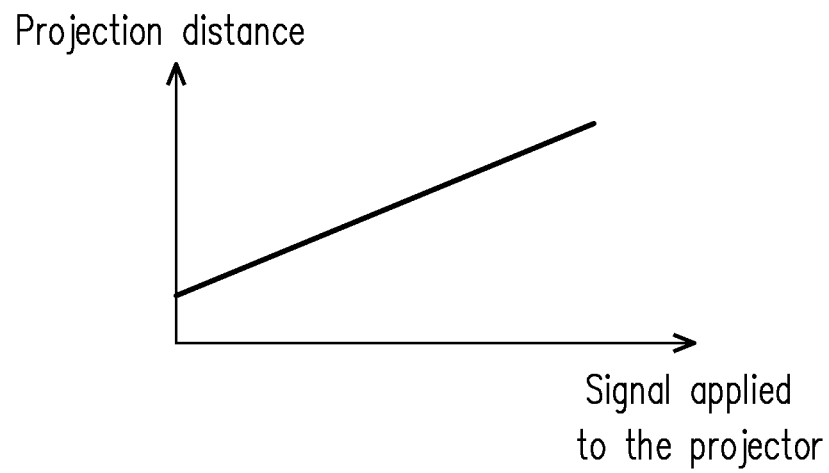
FIG. 7A is a plot showing the relationship between the signal applied to the projector and the projection distance.
Figure 7B:
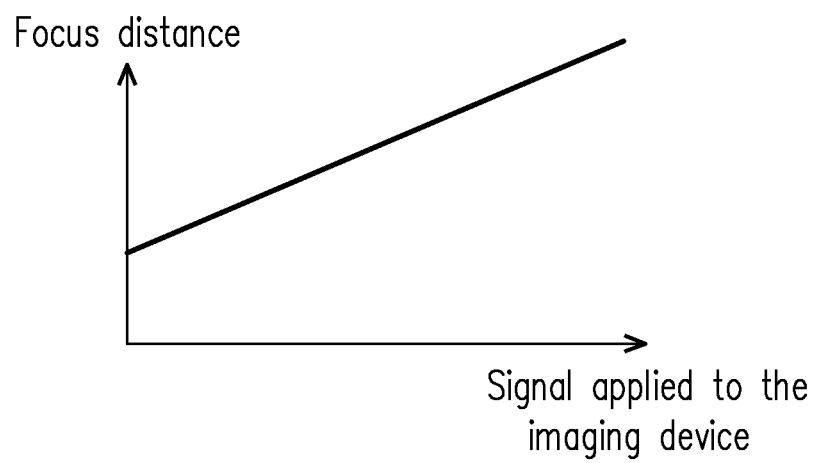
FIG. 7B is a plot showing the relationship between the signal applied to the imaging device and the focus distance.

FIG. 6 is a flow chart showing a profile measurement method operated in asynchronous mode according to another embodiment of the disclosure. The profile measurement method operated in asynchronous mode includes the steps of: sending a command signal to a projection system (e.g. an optical system of a projector) to project a light pattern at distances along the height of the object (step 610); for each projecting distance in step 610, sending a command signal to an imaging system (e.g. a lens system of an imaging device) to capture sets of images within a range above and below the location of the projected light pattern on the object (step 620); obtaining a set of sharpest images within the sets of images captured in step 620 (step 630); obtaining in-focus pixels in each images of the set of sharpest images obtained in step 630 (step 640); reconstructing a large depth of field pattern image (step 650); computing the object profile from the reconstructed pattern obtained in step 650 (step 660).

Figure 11A:
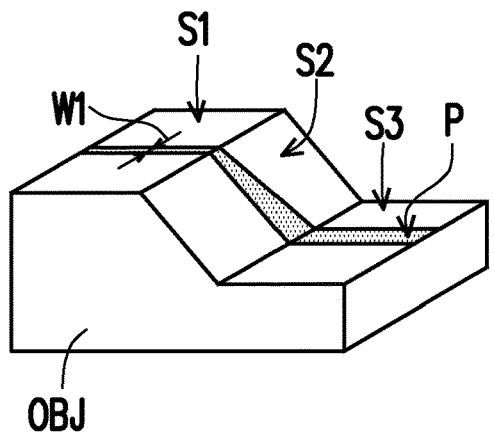
FIG. 11A to FIG. 11C are schematic views showing the same object on which a line pattern is projected at different projection distances.
Figure 11B:
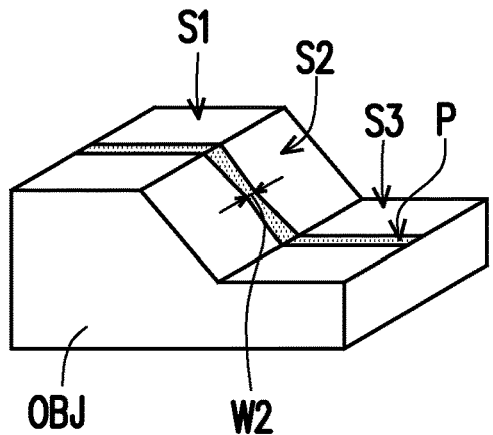
Figure 11C:
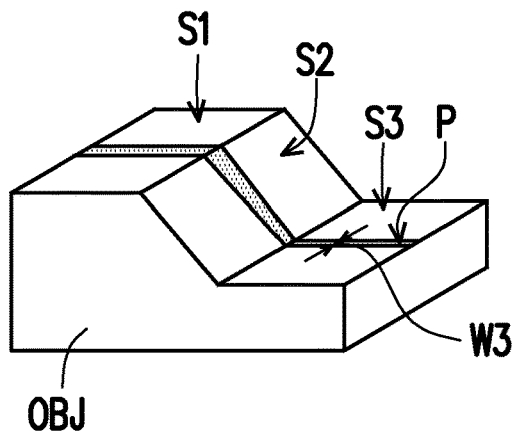

To better understand the functioning principle of the disclosure, reference is made to FIG. 11A to FIG. 11C and FIG. 12. FIG. 11A to FIG. 11C are schematic views showing the same object OBJ on which a pattern P, represented here as a line, is projected at different projection distances. In FIG. 11A, the projector is controlled by the controller to project the pattern P at a first projection distance, and the imaging device is controlled by the controller to capture the image at a first focus distance. The planes of focus of the projector and the imaging device are both on the surface S1 of the object OBJ, located at the top of the object, where the line width of the projected line has the smallest width, noted W1. Surfaces S2 and S3 of the object OBJ are located at a larger distance from the projection system compared to S1, therefore the line width of the line light increases as vertical distance to the plane of focus increases.

In FIG. 11B, the projector is controlled by the controller to project the pattern P at a second projection distance, located for the sake of illustration, at the middle of the distance between surfaces S1 and S3, where the line width of the projected line has the smallest width, noted W2. The imaging device is controlled by the controller to capture the image at a second focus distance, corresponding to the location on surface S2 at which the pattern is projected. The projection distance of the projector is obtained by sending the appropriate control signal to the variable focal length lens of the projector and, similarly, the image capture focus distance is obtained by sending the appropriate signal to the variable focal length lens of the image capture system. The width W2 of the pattern P is smallest at the second projecting distance and increases as vertical distance to the plane of focus varies.

Figure 12:
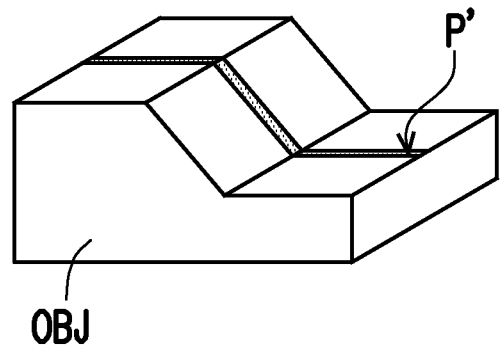
FIG. 12 is a schematic view showing the same object as on FIG. 11 and a reconstructed large depth of field projected pattern.

In FIG. 11C, the projector is controlled by the controller to project the pattern P at a third projection distance located at the bottom of the object, on surface S3, where the line width of the projected line has the smallest width, noted W3. The imaging device is controlled by the controller to capture the image at a third focus distance, corresponding to the location on surface S3 at which the pattern is projected. The projection distance of the projector is obtained by sending the appropriate control signal to the variable focal length lens of the projector and, similarly, the image capture focus distance is obtained by sending the appropriate signal to the variable focal length lens of the image capture system. The width W3 of the pattern P is now smallest at the third projecting distance and increases as vertical distance to the plane of focus decreases. FIG. 12 is a schematic view showing the reconstructed large depth of field projected pattern P' from which the profile of the object OBJ can be obtained.

In an embodiment, the profile measurement method may further include a calibration step consisting in projecting a line light on a flat surface, capturing the image of the projected line light and applying appropriate image processing to remove any distortion in the projected line light. The calibration step also applies when the projected light includes a pattern of any geometrical shape or combination of geometrical shapes, in which case the calibration steps include obtaining the transformation mathematical entity such as a matrix between the captured image of the projected pattern on the flat surface and the un-distorted pattern.

Figure 8:
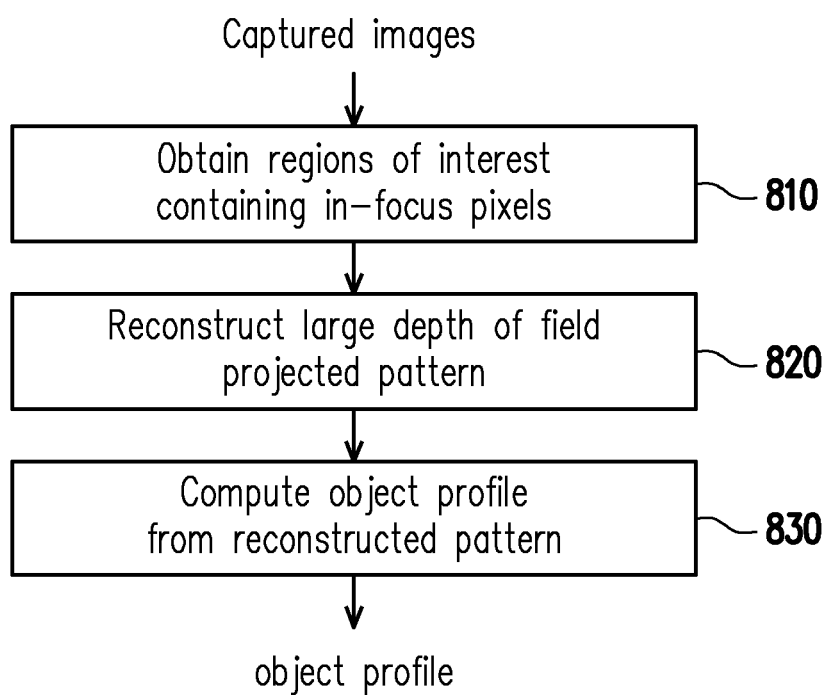
FIG. 8 is a flow chart showing image processing steps for object profile reconstruction according to an embodiment of the disclosure.
Figure 9:
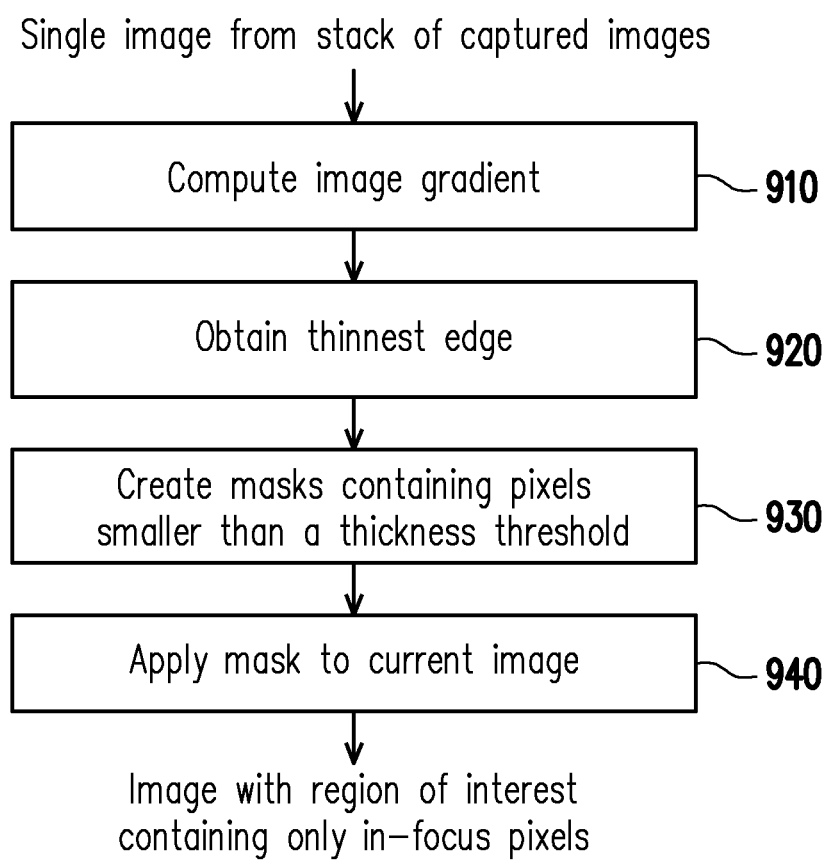
FIG. 9 is a flow chart showing detailed steps corresponding to step 810 in FIG. 8 according to an embodiment of the disclosure.
Figure 10A:
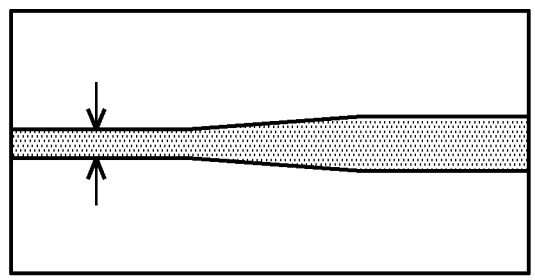
FIG. 10A to FIG. 10C are schematic views corresponding to steps 920, 930 and 940 in FIG. 9 respectively.
Figure 10B:
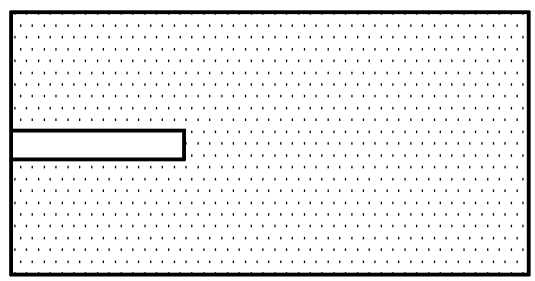
Figure 10C:
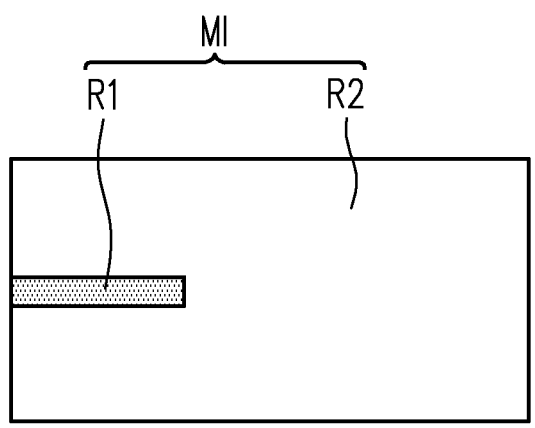

After capturing images of the pattern at different projection distances, the profile of the object can be obtained by subsequent data processing steps. These steps are illustrated in FIG. 8 to FIG. 10C. FIG. 8 is a flow chart showing image processing steps for object profile reconstruction according to an embodiment of the disclosure. The steps include obtaining regions of interest containing in-focus pixels (step 810), reconstructing a large depth of field projected pattern (step 820) and computing the object profile from the reconstructed pattern obtained in step 820 (step 830). FIG. 9 is a flow chart showing detailed steps corresponding to step 810 of FIG. 8 according to an embodiment of the disclosure. FIG. 10A to FIG. 10C are schematic views corresponding to steps 920, 930 and 940 in FIG. 9 respectively. FIG. 10A corresponds to the situation illustrated on FIG. 11A where the pattern is projected on surface S1 of the object. In step 910 of FIG. 9, the processing unit may compute an image gradient. In step 920, the processing unit may obtain the thinnest edges, FIG. 10A shows the thinnest edge with arrows. In step 930, the processing unit may create masks containing only in-focus pixels which are pixels corresponding to edges smaller than a thickness threshold. The thickness threshold may be obtained by a calibration step where a line light is projected at a distance at which the line is thinnest, and captured at the best focus distance of the image capture system. By applying a gradient on the captured image of the thin and in-focus line light, a line thickness expressed in pixel and subpixels may be obtained and represent the thickness threshold. In step 940, the processing unit may apply the mask (an illustration of which is in FIG. 10B) to the current image (shown in FIG. 10A). The mask may be binary and constituted of zeros and ones and it may be applied to the image by a multiplication operation. The output of step 940 is an image containing only in-focus pixels, the result of the application of the mask to the current image on step 940 is illustrated on FIG. 10C.

Referring back to FIG. 8, in step 820, the processing unit may reconstruct a large depth of field projected pattern based on the mask images. FIG. 12 is a schematic view showing the reconstructed large depth of field projected pattern P'. The shape of the reconstructed large depth of field projected pattern P' is a thin line which width is significantly constant over the height profile of the object OBJ. The object profile can then be reconstructed using triangulation methods, such as laser based triangulation systems, this is performed in step 830.

In summary, in the embodiments of the disclosure, the pattern is projected at different heights along the optical axis of the projection system onto the surface of the object by controlling the focal length of the variable focal length lens element in the projector, and each pattern projected at different heights along the optical axis of the projection system is captured by the imaging device. A large depth of field pattern image having a depth of field larger than or equal to the height difference of the object may be reconstructed based on the captured images. Therefore, the profile measurement system and the profile measurement method in the embodiments of the disclosure are capable of measuring objects having a depth or height larger than the depth of field of the system of prior art systems, and it enables the use of LED as a light source. In one embodiment, the imaging device may also include a variable focal length lens element, and the variable focal length lens elements in the projector and the imaging device may be operated in a synchronous or an asynchronous mode.

It will be apparent to those skilled in the art that various modifications and variations can be made to the structure of the disclosed embodiments without departing from the scope or spirit of the disclosure. In view of the foregoing, it is intended that the disclosure covers modifications and variations of this disclosure provided they fall within the scope of the following claims and their equivalents.

What is claimed is:

1. A profile measurement system comprising:
   a light projector configured to project a pattern of light on an object, the pattern comprising at least one geometrical shape, wherein the light projector comprises:
   a light source configured to provide light;
   a mask disposed on a transmission path of the light and having an aperture to allow a portion of the light to pass through and to generate the pattern; and
   an optical system disposed on the transmission path of the light and comprising a variable focal length lens element, wherein the optical system is configured to project the pattern at different projection distances;
   an imaging device configured to capture images of the pattern of light projected at the different projection distances, wherein the imaging device comprises a lens system and an imaging sensor, wherein an optical axis of the light projector and an optical axis of the imaging device intersect each other at least at a point on a plane of focus on a surface of the object, and an angle included between the optical axis of the light projector and the optical axis of the imaging device is larger than 0 degrees and smaller than 180 degrees;
   a control system configured to control a projection distance of the light projector and a focus distance of the imaging device; and
   a processing unit configured to obtain in-focus pixels in the captured images, generate mask images each containing a mask region and an in-focus region based on the in-focus pixels, reconstruct a large depth of field pattern image based on the captured images and reconstruct the object profile.

2. The profile measurement system as recited in claim 1, wherein the pattern comprises at least one straight line or at least one curved line or a combination thereof.

3. The profile measurement system as recited in claim 1, wherein the light source comprises at least one light emitting diode.

4. The profile measurement system as recited in claim 1, wherein the optical system of the light projector is telecentric.

5. The profile measurement system as recited in claim 1, wherein the optical system of the light projector further comprises a conditioning lens and a projecting lens, the conditioning lens is located between the light source and the mask, and the mask is located between the conditioning lens and the projecting lens.

6. The profile measurement system as recited in claim 5, wherein the variable focal length lens element is located between the projecting lens and the mask.

7. The profile measurement system as recited in claim 5, wherein the projecting lens is located between the variable focal length lens element and the mask.

8. The profile measurement system as recited in claim 5, wherein the conditioning lens is configured to project a collimated or nearly collimated light on the mask.

9. The profile measurement system as recited in claim 1, wherein the lens system of the imaging device is object-side telecentric or bi-telecentric.

10. The profile measurement system as recited in claim 1, wherein the light source has a shape corresponding to the mask and comprises a plurality of light emitting diode chips arranged according to a shape of the aperture of the mask.

11. The profile measurement system as recited in claim 1, wherein the imaging device further comprises a variable focal length lens element.

12. The profile measurement system as recited in claim 11, wherein the variable focal length lens element in the light projector and the variable focal length lens element in the imaging device are operated in a synchronous mode.

13. The profile measurement system as recited in claim 11, wherein the variable focal length lens element in the light projector and the variable focal length lens element in the imaging device are operated in an asynchronous mode.

14. A profile measurement method comprising:
   projecting a pattern on an object at different projection distances by a light projector;
   capturing images of the pattern projected at the different projection distances by an imaging device, wherein an optical axis of the light projector and an optical axis of the imaging device intersect each other at least at a point on a plane of focus on a surface of the object, and an angle included between the optical axis of the light projector and the optical axis of the imaging device is larger than 0 degrees and smaller than 180 degrees;
   obtaining in-focus pixels in the captured images;
   reconstructing a large depth of field pattern image; and
   obtaining the object profile.

15. The profile measurement method as recited in claim 14, wherein projecting the pattern at different projection distances comprises changing signal applied to a variable focal length lens element in the light projector that projects the pattern.

16. The profile measurement method as recited in claim 14, wherein capturing images of the pattern projected at the different projection distances comprises changing signal applied to a variable focal length lens element in the imaging device that captures the images.

17. The profile measurement method as recited in claim 15, wherein accessing in-focus pixels in the captured images comprises:
   generating mask images each containing a mask region and an in-focus region based on the in-focus pixels.

18. The profile measurement method as recited in claim 14 further comprising:
   calibrating the light projector for projecting the pattern and calibrating the imaging device for capturing the images so that an image of an un-distorted pattern is captured when a flat object is positioned along the optical axis of the light projector.

* * * * *